United States Patent [19]
Mecredy

[11] 3,800,829
[45] Apr. 2, 1974

[54] SPOOL VALVE DEVICE
[75] Inventor: James R. Mecredy, Lakewood, Ohio
[73] Assignee: The Cleveland Range Company, Cleveland, Ohio
[22] Filed: June 1, 1972
[21] Appl. No.: 258,723

[52] U.S. Cl. .......................................... 137/625.27
[51] Int. Cl. ............................................. F16k 11/07
[58] Field of Search ............ 251/63, 324, 189, 214; 137/625.25, 625.26, 625.27; 215/52–54

[56] References Cited
UNITED STATES PATENTS

| 2,023,560 | 12/1935 | Wayer | 251/189 |
| 2,478,350 | 8/1949 | Wirz | 251/214 |
| 2,659,567 | 11/1953 | Rand | 251/324 |
| 3,386,700 | 6/1968 | Greene et al. | 251/214 X |
| 3,420,262 | 1/1969 | O'Neill | 251/214 X |

Primary Examiner—Henry T. Klinksiek
Attorney, Agent, or Firm—Teare, Teare & Sammon

[57] ABSTRACT

A valve assembly for control of pressurized fluid, such as steam, to a vessel, such as a steam cooker, including a hollow body having a bore therein. The body includes supply port means for transmitting the fluid to the vessel and discharge port means for transmitting the fluid from the vessel to a drain. A unitary, one-piece spool member made of a deformable material is mounted for movement within the bore in sealing relation with the body. A support member is mounted for movement relative to the body and the spool member is mounted adjacent one end of the support member being adapted to be moved by the support member relative to the body for sealing registration with the supply port means and discharge port means. The support member includes adjustment means adapted for coacting engagement with the spool member for selectively deforming the spool member and controlling the sealing engagement thereof with the valve body.

14 Claims, 12 Drawing Figures

PATENTED APR 2 1974 3,800,829
SHEET 1 OF 2

3,800,829

SPOOL VALVE DEVICE

BACKGROUND OF THE INVENTION

The present invention relates to valve assemblies, and more particularly, to valve assemblies of the slide or spool type for selectively controlling the flow of a pressurized fluid between a plurality of ports or passageways.

Generally, slide or spool valves used in the controlling of the flow of pressurized fluid, such as steam or the like, in the heating of a vessel, such as a steam cooker or the like, are required to operate at extremely high temperatures and are actuated at frequency intervals. Under such conditions, the sealing parts of such valves encounter excessive wear. Slide valve assemblies have not proven to be entirely satisfactory for such frequency actuation and operation at such high temperatures, and thus, have been subject to extremely rapid and excessive wear to the sealing parts causing substantial loss of time for maintenance and repair thereto.

Therefore, it has become extremely desirable to develop a spool or slide valve assembly which can be operated frequently and at relatively high temperatures without experiencing excessive maintenance and requiring frequency replacement of the sealing parts thereof as compared to previously known and used devices.

SUMMARY OF THE INVENTION

The present invention contemplates providing an improved valve assembly which includes a body having a lengthwise extending bore and a plurality of ports communicating with the bore. A slide valve means is disposed for movement within the bore adapted to selectively interconnect certain of the ports, and includes a support member disposed for reciprocal movement within the bore. A one-piece spool member made from a resilient compressible material is mounted adjacent one end of the support member and interiorly of the bore having its outer peripheral surface disposed for friction sliding engagement with the confronting interior surface of the bore for closing off selective of the ports. An adjustment means is operably associated with the support member for selectively compressing the spool member and to radially expand it into pressured sealing contact with the interior surface of the bore. The spool member is of a cylindrical construction having a substantially uniform diameter throughout its length being defined on its opposite sides by generally flat end surfaces disposed substantially normal to the longitudinal axis thereof. The spool member may include a plurality of apertures formed therein to increase the compressibility and related characteristics thereof. The apertures may extend axially of the spool member having a lengthwise dimension less than the lengthwise dimension of the spool member so as to prevent the leakage of pressurized fluid between the opposite ends of the spool member. A sealing assembly including a packing member is disposed adjacent one end of the bore in tandem relation with the spool member on the support member being adapted for sealing off one end of the bore and for abutting engagement with the spool member upon reciprocal movement of the support member. The packing member includes a central opening adapted to slidably receive the support member therethrough and to enable the spool member to be moved between the respective ports and into and out of engagement with the packing member.

By this arrangement, the entire body of the spool member is subject to deformation which enables a wide range of adjustability for maintaining pressured sealing engagement with the surrounding wall of the bore. As a result, considerably more wear can be sustained by the spool member before such requires maintenance or replacement. Further, the range of adjustment can be increased, as desired, by controlling the uniformity of the mass of the spool member. That is, the extent of deformability of the spool member can be predetermined by providing the spool member in a solid or apertured form depending upon the degree of compressibility required. In addition, the sealing assembly adjacent the one end of the valve body is also subject to a wide range of adjustment and which, together with the spool member, form a sealing system which is capable of operation over extensive periods of time with considerably less maintenance and parts replacement than has been required by previously known arrangements.

DESCRIPTION OF THE PREFERRED EMBODIMENTS

Figure 2:
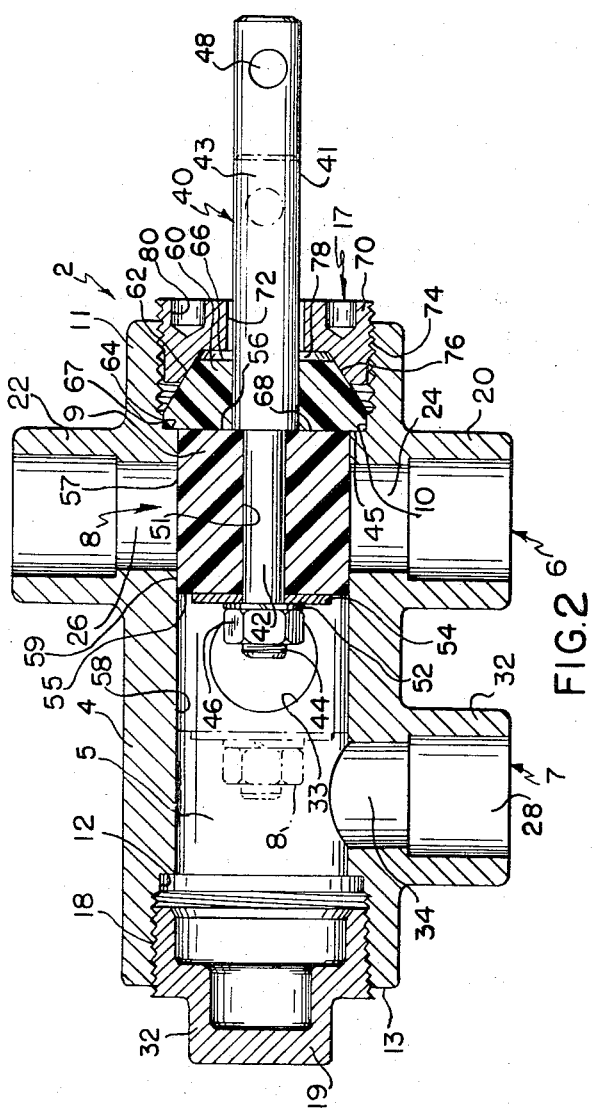
FIG. 2 is a transverse sectional view taken along the line 2—2 of FIG. 1.

The valve assembly of the present invention is illustrated in FIG. 2, generally at 2, and is shown as including a hollow body 4 having a supply port means 6 adapted for transmitting a pressurized fluid, such as steam, from a source, such as a boiler, to a heating vessel, such as a steam cooker, and a discharge port means 7 adapted for transmitting the spent steam or condensed moisture from the steam cooker to a drain. A spool means 8 including a deformable spool member 9 is operably mounted in the body 4 being adapted for selective sealing registration with the supply port means 6 and a discharge port means 7 to selectively control the introduction and discharge of the steam to and from the steam cooker.

Figure 1:
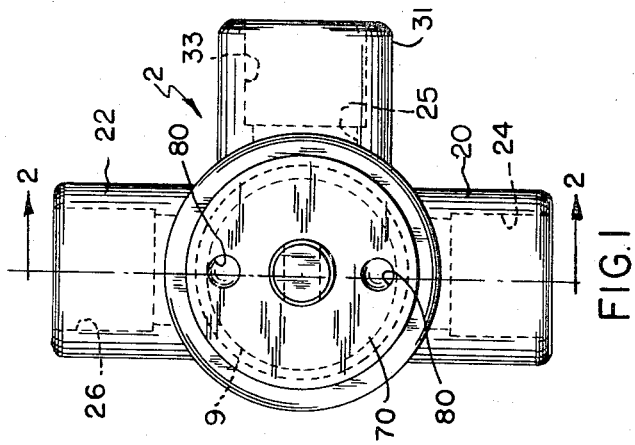
FIG. 1 is an end elevation view of the valve assembly of the present invention.

As shown in FIGS. 1 and 2, the body 4 is of a generally cylindrical construction and may be made of any suitable material, such as steel or the like. As shown, the body 4 includes a cylindrical bore 5 which extends lengthwise of the body 4 and includes a counter bore 10 at one end, such as the front end 11, adapted for receiving a sealing assembly 17 for closing off the front end 11 of the body 4. The opposite or rear end 13 of the body 4 includes another counter bore 12 which is threaded as at 18 for receiving an end cap 19 for closing off the cavity 5 adjacent the rear end 13. This arrangement enables installation and removal of the spool assembly 9 within the valve body 4 to achieve operation in a manner to be described more fully hereinafter.

The supply port means 6 is shown as including an inlet port 20 which is adapted for connection to the boiler and an outlet port 22 which is adapted for connection to the steam cooker. As shown, the inlet port 20 and the outlet port 22 each includes a radially extending passageway, such as at 24 and 26, respectively, which are disposed on diametrically opposed sides of and in fluid communication with the bore 5. In the form shown, the passageways 24 and 26 comprise cylindrical bores which extend generally radially inwardly through the body 4 and which are axially aligned with one another and are each adapted at one end, such as their inner end, for sealing engagement with the spool member 9 and at their opposite, or outer end, for attachment to suitable fittings (not shown) for connecting the valve assembly 2 to the source of heating steam and the steam cooker. By this arrangement, when the spool assembly 8 is in the closed position, as indicated by the solid lines in FIG. 2, the inlet port 20 will be sealed off from the outlet port 22, preventing steam from entering the steam cooker.

The discharge port means 7 is shown as including an inlet port 31 which is adapted for connection to the steam cooker and an outlet port 32 which is adapted for connection to the drain to enable the drainage of steam or condensed moisture from the steam cooker to the drain. As shown, the inlet port 31 and the outlet port 32 each includes a radially extending passageway, such as at 33 and 34, respectively, which are disposed in laterally spaced relation from one another in the axial direction of the bore 5. In the form shown, the passageways 33 and 34 comprise cylindrical bores which have their central axes disposed generally perpendicular to one another and are each adapted at one end for sealing engagement with the spool member 9 and at the opposite end for attachment to suitable fittings (not shown) for connecting the valve assembly 2 to the steam cooker and the drain, as aforesaid. The inlet port 31 is also arranged such that its central axis is perpendicular to the central axis of the passageways 24 and 26 and such that the passageway 33 is offset from the passageway 34 in the direction toward the passageways 24 and 26 being disposed generally intermediately therebetween. By this arrangement, when the spool assembly 8 is moved to the open position, as indicated by the dotted lines at 8, this will enable the steam to flow from the boiler inwardly through the inlet port 20 and outwardly through the outlet port 22 into the steam cooker, and the spool member 9 will be moved into sealing relation over the passageway 33, as well as with the surrounding wall 58 of the bore 5, and thus prevent the steam entering the steam cooker from escaping through the passageway 34.

The spool member 9 of the spool assembly 8 is shown as being of a unitary, one-piece construction and generally cylindrical in transverse section having a generally uniform diameter in its axial direction. As shown, the spool member 9 includes a generally circular outer peripheral wall 57 and is defined in its axial direction by generally flat end walls 55 and 56 which are disposed normal to the peripheral wall 57. The spool member 9 may be made of any suitable compressible or deformable material which is capable of being deformed axially and radially within the bore 5 being adapted for pressured sealing contact with the valve body 4. For example, the spool member 9 may be made of a polymeric material, such as Teflon, or may be made of elastomeric material, such as neoprene or rubber. Preferably, the material should be of the type capable of operating under relatively high temperatures, such as up to 500° F.

The spool assembly 8 is also shown as including a support member 40 which is adapted for supporting the spool member 9 thereon. As shown, the support member 40 comprises an elongated, cylindrical rod 41 which extends in its lengthwise direction generally axially through the bore 5 and through the sealing assembly 17 being adapted for reciprocating movement in its lengthwise direction and relative to the valve body 4. The rod 41 includes an outer end 43 which extends outwardly from the valve body 4 being adapted for connection to an actuating mechanism, as at 48, and an inner end 42 which is disposed within the bore 5 being adapted for attachment to the spool member 9 for moving the spool member 9 along the bore 5. As shown, the inner end 42 is of a reduced diameter as compared to the outer end 43 defining a shoulder 45 adapted to seatingly engage the one end wall 56 of the spool member 9. The distal end of the rod 41 adjacent the inner end 42 is threaded, as at 44, to receive a nut 46 for forcibly engaging a compression pad 54 and urging the pad 54 into engagement with the other end wall 55 of the spool member 9. By this arrangement, the spool member 9 is secured to the rod 41 in a manner such that tightening of the nut 46 will cause deformation of the spool member 9 in the axial and radial direction thereof to control the sealing contact with the valve body 4. A lock washer 52 may be inserted between the nut 46 and the pad 54 to maintain the nut 46 in the tightened position against the pad 54. Further, the spool member 9 has a diameter which is less than the diameter of the bore 5 being slightly undersized as compared to the bore 5 such that it may be slid easily into the bore 5, and then selectively expanded into sealing engagement with the confronting wall 58 of the bore 5, as at 59, upon tightening of the nut 46. For example, when the nut 46 is threaded on the threads 44 and urged into engagement with the compression pad 54, the compression pad 54 is forced against one end wall, such as 55, of the spool member 9 causing the opposite end wall, such as 56, of the spool member 9 to be forced into engagement with the shoulder 45. Further tightening of the nut 46 will cause the entire spool member 9 to be compressed axially so as to cause expansion radially thereof into tight seating engagement with the surrounding wall 58 of the bore 5. Such arrangement provides for tight sealing engagement throughout the entire axial dimension of the spool member 9 and provides for an extensively wide range of control deformation of the spool member, and thus, a wide range of control over the sealing contact between the sealing member and the surrounding wall 58 of the bore 5.

As shown, the spool member 9 has a minimum axial length which is greater than the maximum transverse dimension of any of the passageways 24, 26, 33 and 34 in the axial direction of the spool member such that the outer peripheral wall 57 of the spool member 9 will cover the entire open area of the passageways 34, 26, 33 and 34. Further, the lateral spacing between the passageways 28 or 30, and the passageway 33 is such that when the spool member is in covering, sealing relation over the passageways 24 and 26, the passageway 33 will be uncovered, Likewise, the spacing between the passageways 33 and 34 is such that the passageway 34 will be uncovered when the spool member 9 is in covering, sealing relation over the passageway 33.

Figure 6:
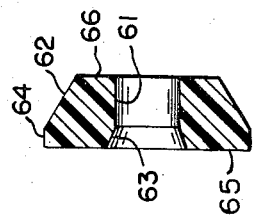
FIG. 6 is a transverse sectional view taken along the line 6—6 of FIG. 5.
Figure 5:
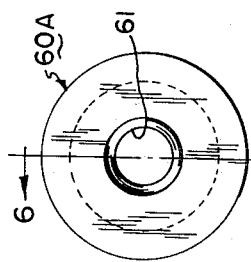
FIG. 5 is an end elevation view of the packing member of the present invention shown in FIG. 2.

As shown in FIG. 2, the sealing assembly 17 includes a packing member 60 and a collar or stuffing nut 70 for holding the packing member 60 in the installed sealing position adjacent the front end 11 of the valve body 4. Referring now to FIGS. 5 and 6, the packing member 60 is shown as having a generally cylindrical shape in end elevation (FIG. 5) being defined by a generally circular peripheral wall 64. The packing member 60 may be made of any suitable deformable material, similar to the material comprising the spool member 9, that is, it may be made of Teflon, neoprene, rubber, etc. As shown, the packing member 60 is of a generally flat construction in side elevation including a generally planar outer face 66 and a generally planar inner face 65 adapted to engage the end wall 56 of the spool member 9 in sealing relation in the closed position of the spool assembly 8 (FIG. 1). An aperture or bore 61 extends generally axially through the packing member 60 between the outer face 66 and the inner face 65, being adapted to receive the rod 41 therethrough for supporting the packing member in tandem, axially aligned relation to the spool member 9. In the non-installed condition, as shown in FIG. 6, the bore 61 is beveled outwardly adjacent the inner face 65, as at 63, being adapted to facilitate the insertion of the rod 41 therethrough for sliding sealing engagement therewith. That is, the rod 41 is made oversize with respect to the maximum diameter of the bore 61, and undersize with respect to the maximum diameter of the bevel 63 such that when the rod 41 is inserted into the bore 61 adjacent the bevel 63, the material of the packing member 60 will be deformed outwardly, and thus, will tightly engage, in sealing relation, and confronting surface of the rod 41. The peripheral wall 64 of the packing member 60 has a diameter which is slightly smaller than the diameter of the counter bore 10 such that the inner face 65 will abuttingly engage the shoulder 67 defined by the counter bore 10 and the bore 5. The packing member 60 is shown as including a cam surface 62 adjacent its outer face 66 which is beveled radially, inwardly, and outwardly in a direction from the peripheral wall 64 to the outer face 66 and is adapted for camming coacting engagement with the collar 70 for compressingly deforming the packing member 60 into tight sealing engagement with the shoulder 67 and the rod 41 when in the installed position.

Figure 3:
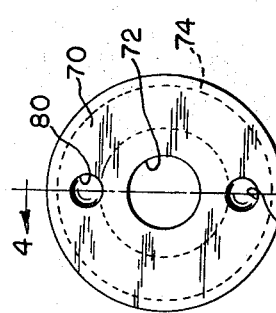
FIG. 3 is an end elevation view of the stuffing nut or collar shown in FIGS. 1 and 2.
Figure 4:
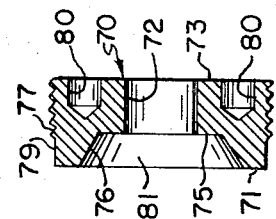
FIG. 4 is a transverse sectional view taken along the line 4—4 of FIG. 3.

The collar 70 is shown in FIGS. 3 and 4 as being generally circular in end elevation being defined by a circular outer peripheral wall 79. The collar 70 is also shown as being of a generally flat construction in side elevation being defined by a generally planar outer face 73 and a generally planar inner face 71. The collar 70 may be made of the same material as the valve body 4, that is, steel or the like, having external threads 27 on the exterior peripheral wall 79 thereof for threadably engaging corresponding internal threads, as at 74, within the counter bore 10. As shown, the collar 70 includes an axially extending, generally crcular bore 72 which is adapted to be disposed in axially aligned relation with the bore 61 in the packing member 60 in the installed position thereof for receiving the rod 41 therethrough. The bore 72 is shown as slightly oversized in diameter as compared to the diameter of the rod 41 so that the rod 41 may move freely in its lengthwise direction therethrough without binding on the collar 70. A counter bore or recess 81 is formed in the collar 70 which is adapted to receive the end of the packing member 60 adjacent the outer face 66. As shown, the recess 81 is formed in the collar adjacent the inner face 71 defining with the bore 72 in radially extending shoulder 75. The recess 81 is generally frusto-conical in configuration being defined by an inclined circular side wall 76 which extends between a shoulder 75 and the inner face 71 being inclined radially outwardly and inwardly so as to correspond to the formation of the beveled surface 62 for sliding, camming coacting engagement therewith. Further, the collar 70 may be provided with holes 80 which extend inwardly from the outer face 73 for receiving pins (not shown) of a wrench for tightening the collar 70 against the packing member 60. By this arrangement, when the spool assembly 8 is actuated to move the spool member 9 to the open position, as indicated by the dotted lines at 8, the outer face 65 and the peripheral wall 64 of the packing member 60 will be tightly held against the shoulder 67 and the counter bore 10, respectively, by the collar 70 to seal off the front end 11 of the valve body. Further, the collar 70 may be periodically tightened so as to increasingly deform the packing member 60 and force the packing member 60 into tighter sealing engagement around the rod 41.

Figure 7:
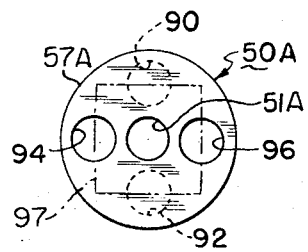
FIG. 7 is an end elevation view of another form of spool member of the present invention.
Figure 8:
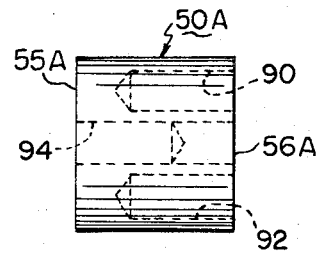
FIG. 8 is a side elevation view of the spool member shown in FIG. 7 when looking from the right hand side of FIG. 7.
Figure 9:
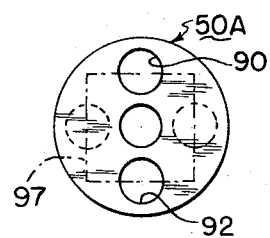
FIG. 9 is an end elevation view showing the end opposite to the end of the spool member shown in FIG. 7.

As previously stated, the spool member 9 is shown in FIG. 2 as having a generally solid construction. In FIGS. 7 to 12, there is illustrated other forms of spool members 9a and 9b which have an apertured construction for controlling the deformability thereof. As shown in FIGS. 7 to 9, the spool member 9a includes a plurality of apertures, such as four (4) apertures 90, 92, 94 and 96 therein. The apertures 90, 92, 94 and 96 extend generally axially in the direction between the outer face 56a and the inner face 55a. The apertures 90, 92, 94 and 96 may be of any suitable configuration, and in the form shown are generally circular in transverse section and are arranged such that their centers define a square, as indicated by the broken lines at 97, and have their lengthwise axis extending generally parallel to the central axis of the bore 51a and spaced equidistantly from the outer peripheral wall 57a and uniformly about the center of the bore 51a. As shown in FIG. 8, one set, such as a pair of apertures 90 and 92, extend inwardly from one face, such as the outer face 56a and terminate short of the opposite face or inner face 55a, whereas another set, such as the pair of apertures 94 and 96, extend inwardly from the inner face 55a and terminate short of the outer face 56a. By this arrangement, fluid communication is prevented between the opposite faces 55a and 56a to prevent leakage through the spool member 9.

Figure 10:
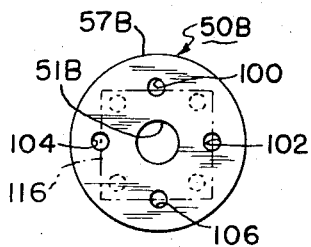
FIG. 10 is still another form of the spool member of the present invention.
Figure 11:
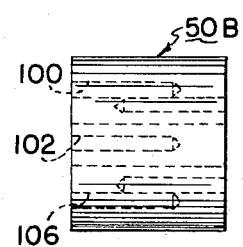
FIG. 11 is a side elevation view of the spool member shown in FIG. 10 as seen from the right side of FIG. 10.
Figure 12:
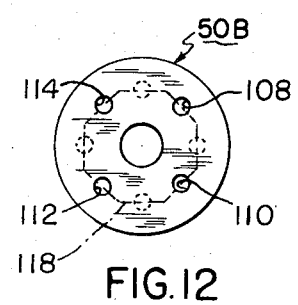
FIG. 12 is an end elevation view showing the end opposite to the end of the spool member shown in FIG. 10.

In the spool member 9b shown in FIGS. 10 to 12, a plurality of apertures, such as eight (8) apertures, 100, 102, 104, 106, 108, 110, 112 and 114 are provided which have a reduced diameter as compared to the apertures 90, 92, 94 and 96 of the spool member 9a shown in FIGS. 7 to 9. In the spool member 9b, the apertures are provided in sets with one set, including the apertures 100, 102, 104 and 108, extending axially inwardly from one face, such as the inner face 55b and terminating short of the opposite face 56b, whereas, the apertures in another set including the apertures 108, 110, 112 and 114 extend axially inwardly from the outer face 56b and terminate short of the opposite or inner face 55b. The apertures in the one set including the apertures 100, 102, 104 and 106 are arranged such that their centers define a square, as indicated by the broken lines at 116, and the apertures of the other set, including the apertures 108, 110, 112 and 114, are arranged such that their centers are positioned generally intermediately between the respective centers of the apertures 100, 102, 104 and 106 and are spaced equidistantly from the center of the bore 51b and the outer peripheral wall 57b and uniformly from one another and about the center of the bore 51b so as to define an octagon as indicated by the broken lines at 118.

As can be seen, by varying the length, diameter and number of apertures provided in the spool members, the deformability of the spool members can be predetermined, as desired, and preferably the apertures should be arranged generally symmetrically and uniformly with respect to the central axis of the spool members.

I claim:
1. A valve assembly comprising,
a body having a front end and a rear end and a generally cylindrical, lengthwise extending bore with a plurality of ports communicating with said bore,
slide valve means mounted on said body being disposed for movement within said bore and adapted to selectively interconnect certain of said ports,
said slide valve means includes a support member disposed for reciprocal movement within said bore,
said support member comprising an elongated rod having its lengthwise axis extending in the axial direction of said bore and including an outer end adapted to be disposed outwardly of said bore adjacent said front end and an inner end adapted to be disposed interiorly of said bore,
a one-piece spool member made from a resilient, compressible material mounted on the inner end of said rod being disposed interiorly of said bore for movement by said rod between a closed position and an open position,
said spool member is of a generally cylindrical construction including generally flat end walls,
said rod having a shoulder disposed axially inward from the distal end of its inner end abuttingly engaging said spool member,
said spool member being disposed in encompassing relation about the inner end of said rod having one end wall disposed in abutting engagement with said shoulder,
said spool member having a substantially uniform transverse dimension throughout its length and outer peripheral surface disposed for pressured sliding engagement with the confronting interior surfaces of said bore for closing-off selective of said ports,
selectively adjustable compression means mounted on said rod on the side of said spool member remote from said shoulder for compressing said spool member in the axial direction of said rod against said shoulder for radially expanding said spool member into pressured sealing contact with the interior surfaces of said bore,
valve seat means mounted on said body adjacent said front end,
said valve seat means including a packing member made of a resilient compressible material,
said body includes an annular bore shoulder disposed within said bore adjacent the front end thereof,
said packing member is of a generally cylindrical configuration and is disposed within said bore including an inner face disposed in abutting engagement with said bore shoulder and extending into said bore,
said packing member including a central bore for slidably receiving said rod therethrough,
a seat member is threadably connected to said body adjacent said front end for compressing said packing member in a radial and axial direction into pressured sealing engagement with said shoulder and said rod for sealing off said one end of said body, and
said spool member is disposed at the end on said bore adjacent said packing member in the closed position of said valve assembly to relieve the pressure on said packing member and prevent leakage through said valve seat means.

2. A valve assembly in accordance with claim 1, wherein
said spool member has an axial length greater than that of the maximum transverse dimension of the associated of said ports.

3. A valve assembly in accordance with claim 2, wherein
said spool member is of a solid construction, and
said end walls of said spool member are disposed substantially normal to the central axis thereof.

4. A valve assembly in accordance with claim 1, wherein
said packing member has a tapered outer peripheral surface portion adapted for pressured sealing and camming engagement with said seat member, and said packing member having a greater maximum transverse dimension as compared to that of said spool member.

5. A valve assembly in accordance with claim 1, wherein
said packing member is mounted in generally fixed relation relative to said support member,
said packing member having a tapered outer peripheral surface portion tapering outwardly and inwardly in a direction away from said spool member, said packing member having generally planar end faces, and said one end wall of said spool member adapted for abutting seating engagement with the confronting end face of said packing member and with the confronting interior surfaces of said bore to provide a fluid seal to prevent leakage of fluid material through said valve seat means to the exterior of said valve.

6. A valve assembly in accordance with claim 1, wherein
said spool member includes a plurality of apertures formed therein to increase the compressibility related characteristics thereof.

7. A spool valve assembly in accordance with claim 6, wherein
said apertures extend axially of said spool member and have a lengthwise dimension less than the lengthwise dimension of said spool member.

8. A valve assembly in accordance with claim 1, wherein
said spool and packing members are disposed in axially aligned relation with respect to one another.

9. A valve assembly in accordance with claim 1, wherein said packing members of a generally frustro-conical configuration, and
said seat member includes a complementary shaped bore portion for receiving said packing member therein.

10. A valve assembly in accordance with claim 1, wherein said one end of said spool member is disposed in abutting engagement with said inner face of said packing member in the closed position of said valve assembly.

11. A valve assembly comprising,
a body having a lengthwise extending bore with a plurality of ports communicating with said bore,
said valve means mounted on said body being disposed for movement within said bore adapted to selectively inter connect certain of said ports,
said valve means includes a support member disposed for reciprocal movement within said bore,
a one-piece spool member made from a resilient, compressible material is mounted on one end of said support member being disposed interiorly of said bore,
said spool member has a substantially uniform transverse dimension throughout its length and its outer peripheral surface is disposed for pressured sliding engagement with the confronting interior surfaces of said bore for closing off selective of said ports, said spool member is of a cylindrical construction and includes a plurality of apertures formed therein to increase its compressibility and related characteristics, and
selectively adjustable compression means mounted on said rod for compressing said spool member in the axial direction of said rod to radially expand said spool member into pressured sealing contact with the interior surfaces of said bore.

12. A valve assembly in accordance with claim 11, wherein
said apertures in said spool member extend axially of said spool member and have a lengthwise dimension less than the lengthwise dimension of said spool member.

13. A spool valve assembly in accordance with claim 12, wherein
some of said apertures extend axially inwardly from one end wall of said spool member, and
the others of said apertures extend axially inwardly from the opposite end wall of said spool member.

14. A valve assembly in accordance with claim 13, wherein
said apertures extending inwardly from one end wall of said spool member are disposed in uniformly spaced relation with respect to the central axis thereof.

* * * * *